(12) United States Patent
Zimmerman

(10) Patent No.: US 12,012,727 B2
(45) Date of Patent: Jun. 18, 2024

(54) SYSTEM AND METHOD FOR ESTIMATING THE WEIGHT OF A LOAD CARRIED BY AN IMPLEMENT OF A WORK VEHICLE

(71) Applicant: CNH Industrial America LLC, New Holland, PA (US)

(72) Inventor: Joshua D. Zimmerman, Willow Springs, IL (US)

(73) Assignee: CNH Industrial America LLC, New Holland, PA (US)

( * ) Notice: Subject to any disclaimer, the term of this patent is extended or adjusted under 35 U.S.C. 154(b) by 552 days.

(21) Appl. No.: 17/091,329

(22) Filed: Nov. 6, 2020

(65) Prior Publication Data

US 2022/0145592 A1 May 12, 2022

(51) Int. Cl.
| | |
|---|---|
| *E02F 9/26* | (2006.01) |
| *E02F 3/28* | (2006.01) |
| *E02F 3/34* | (2006.01) |
| *E02F 3/342* | (2006.01) |
| *E02F 9/20* | (2006.01) |
| *E02F 9/22* | (2006.01) |

(Continued)

(52) U.S. Cl.
CPC ............... *E02F 9/26* (2013.01); *E02F 3/283* (2013.01); *E02F 3/34* (2013.01); *G01B 21/22* (2013.01); *G01C 9/02* (2013.01); *G01G 5/04* (2013.01); *G01G 19/08* (2013.01); *G01G 23/00* (2013.01); *G01K 13/00* (2013.01); *G01P 3/64* (2013.01); *E02F 3/3417* (2013.01); *E02F 3/342* (2013.01); *E02F 9/205* (2013.01); *E02F 9/2203* (2013.01); *E02F 9/2296* (2013.01)

(58) Field of Classification Search
CPC .... E02F 9/26; E02F 3/283; E02F 3/34; G01B 21/22; G01B 19/08; G01B 23/00
See application file for complete search history.

(56) References Cited

U.S. PATENT DOCUMENTS

| | | |
|---|---|---|
| 5,717,167 A | 2/1998 | Filing et al. |
| 9,938,692 B2 | 4/2018 | Shatters et al. |

(Continued)

FOREIGN PATENT DOCUMENTS

| | | | |
|---|---|---|---|
| EP | 3093400 B1 | 8/2018 | |
| WO | WO 2006/098645 A1 | 9/2006 | |
| WO | WO-2006098645 A1 * | 9/2006 | .............. E02F 9/264 |

*Primary Examiner* — James M McPherson
*Assistant Examiner* — Kyle J Kingsland
(74) *Attorney, Agent, or Firm* — Rickard DeMille; Rebecca Henkel; Peter Zacharias

(57) ABSTRACT

A method for estimating the weight of loads carried by implements may include controlling an implement subject to actual weighing conditions to lift a load and receiving an input indicative of a sensed force associated with lifting the load. The method may further include determining a correlation value indicative of a correlation between first and second force values for lifting a given load with the implement as a function of the actual weighing conditions and as a function of nominal weighing conditions, respectively, where at least one of the actual weighing conditions differs from at least one of the nominal weighing conditions. Furthermore, the method may include determining an adjusted force value for lifting the load based at least in part on the sensed force and the correlation value. Additionally, the method may include estimating the weight of the load based at least in part on the adjusted force value.

19 Claims, 4 Drawing Sheets

(51) Int. Cl.
*G01B 21/22* (2006.01)
*G01C 9/02* (2006.01)
*G01G 5/04* (2006.01)
*G01G 19/08* (2006.01)
*G01G 23/00* (2006.01)
*G01K 13/00* (2021.01)
*G01P 3/64* (2006.01)

(56) References Cited

U.S. PATENT DOCUMENTS

2008/0319710 A1\* 12/2008 Hsu .................. G01G 19/083
   702/174
2017/0131134 A1   5/2017 Kang
2017/0350750 A1\* 12/2017 Leslie ................ G01G 19/08
2021/0293000 A1\*  9/2021 Currier ................ E02F 9/265

\* cited by examiner

SYSTEM AND METHOD FOR ESTIMATING THE WEIGHT OF A LOAD CARRIED BY AN IMPLEMENT OF A WORK VEHICLE

FIELD OF THE INVENTION

The present disclosure relates generally to work vehicles and, more particularly, to a system and method for estimating the weight of a load carried by an implement associated with a work vehicle.

BACKGROUND OF THE INVENTION

Work vehicles having loader arms or booms, such as wheel loaders, skid steer loaders, and the like, are a mainstay of construction work and industry. For example, wheel loaders typically include a boom pivotably coupled to the vehicle's chassis that can be raised and lowered at the operator's command. The boom typically has an implement attached to its end, thereby allowing the implement to be moved relative to the ground as the boom is raised and lowered. For example, a bucket is often coupled to the boom, which allows the wheel loader to be used to carry supplies or particulate matter, such as gravel, sand, or dirt, around a worksite or to transfer such supplies or matter to an adjacent transport vehicle (e.g., a truck or railroad car).

When using a work vehicle to perform a material moving operation, it is often desirable to have an accurate estimate of the load weight being carried by the bucket or other implement. For instance, when transferring materials to a transport vehicle, load weight estimates may be used to determine how much material has been loaded onto the transport vehicle to ensure that its load capacity is not exceeded. In this regard, several systems have been developed that attempt to estimate the load weight being carried by within a bucket. However, to date, such systems lack the accuracy and/or reliability typically desired by operators of commercial work vehicles.

Accordingly, an improved system and method for estimating the weight of a load carried by an implement of a work vehicle would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for estimating the weight of loads carried by implements associated with work vehicles. The method includes controlling, with one or more computing devices, an implement to lift a load carried by the implement while the implement is subject to actual weighing conditions. The method further includes receiving, with the one or more computing devices, an input indicative of a sensed force associated with lifting the load while the implement is subject to the actual weighing conditions. Further still, the method includes determining, with the one or more computing devices, a correlation value indicative of a correlation between a first force value for lifting a given load of a known weight with the implement as a function of the actual weighing conditions and a second force value for lifting the given load with the implement as a function of nominal weighing conditions. Moreover, the method includes determining, with the one or more computing devices, an adjusted force value for lifting the load carried by the implement based at least in part on the sensed force and the correlation value. Additionally, the method includes estimating, with the one or more computing devices, the weight of the load carried by the implement based at least in part on the adjusted force value. At least one of the actual weighing conditions differs from at least one of the nominal weighing conditions.

In another aspect, the present subject matter is directed to a system for estimating the weight of loads carried by implements associated with work vehicles. The system includes a work vehicle, an implement supported by the work vehicle and a controller. The controller includes a processor and associated memory, the memory storing instructions, that when implemented by the processor, configure the controller to control the implement to lift a load while the implement is subject to actual weighing conditions. The instructions further configure the controller to receive an input indicative of a sensed force associated with lifting the load while the implement is subject to the actual weighing conditions. Further, the instructions configure the controller to determine a correlation value indicative of a correlation between a first force value for lifting a given load of a known weight with the implement as a function of the actual weighing conditions and a second force value for lifting the given load with the implement as a function of nominal weighing conditions. Moreover, the instructions configure the controller to determine an adjusted force value for lifting the load carried by the implement based at least in part on the sensed force and the correlation value. Additionally, the instructions configure the controller to estimate the weight of the load carried by the implement based at least in part on the adjusted force value. At least one of the actual weighing conditions differs from at least one of the nominal weighing conditions.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
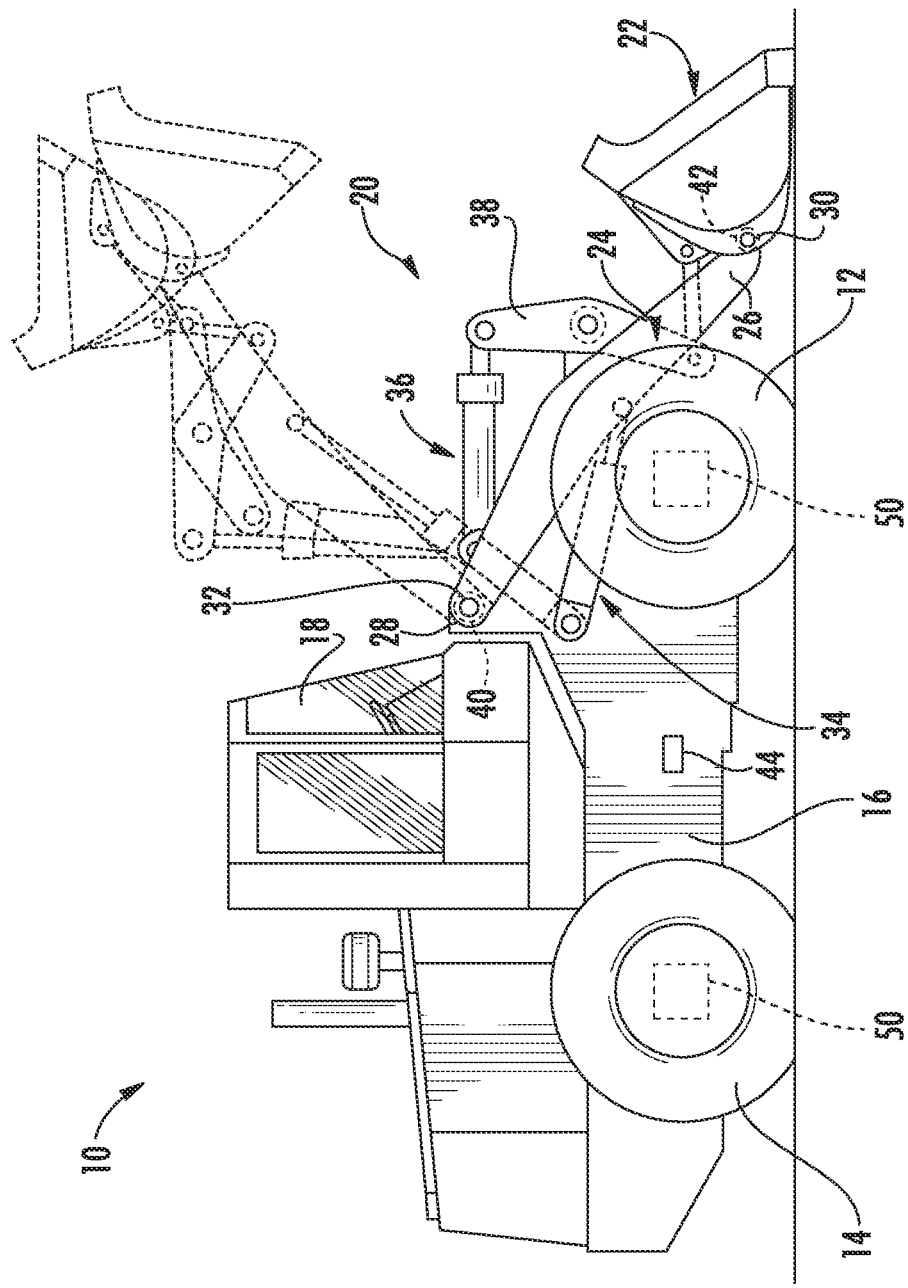
FIG. 1 illustrates a side view of one embodiment of a work vehicle in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for estimating the weight of a load carried by an implement associated with a work vehicle. In particular, a system and method are disclosed that allow for the implement load weight to be more accurately estimated by applying a correction to the measured or sensed force for lifting a load with the implement before estimating the weight of the load.

While lifting a load with the implement, the actual weighing conditions may be different than the nominal weighing conditions present during calibration, which causes the sensed lift force to change due to kinematic, inertial, and/or gravitational effects, even though the actual weight of the load being lifted is unchanged. The changes in the sensed lift force lead to errors in determining the weight of the load. For instance, compared to the nominal weighing conditions where the work vehicle is typically parked on flat ground and the implement is lifted at a desired or predetermined constant speed in a fully rolled tilt position, the actual weighing conditions associated with lifting a load may include the work vehicle being on a slope, the work vehicle accelerating, the implement being lifted at a different speed than the desired or predetermined speed, the implement being lifted at a non-constant speed, and/or the implement being held at a different tilt angle. As such, a correction factor may be used to account for the difference(s) between the actual weighing conditions and the nominal weighing conditions by adjusting the sensed force associated with lifting the load based at least in part on a correlation value indicative of a correlation between a first or actual force value and a second or nominal force value, where the first force value is indicative of a model-based force for lifting a given load of known weight with the implement as a function of the actual weighing conditions being experienced by the work vehicle and the second force value is indicative of a model-based force for lifting the given load with the implement as a function of the calibration or nominal weighing conditions. The adjusted or corrected lift force determined using the correction factor leads to improved estimations for the weight of the load being lifted by the implement. Specifically, after adjusting the sensed force, an estimation of the load weight may be determined, for example, based on the adjusted sensed force value, such as by using stored lookup tables created from the nominal conditions recorded during calibration that relate the adjusted force value to the load weight.

Referring now to the drawings, FIG. 1 illustrates a side view of one embodiment of a work vehicle 10 in accordance with aspects of the present subject matter. As shown, the work vehicle 10 is configured as a wheel loader. However, in other embodiments, the work vehicle 10 may be configured as any other suitable work vehicle that includes a lift assembly for adjusting the position of an associated implement, such as a skid steer loader, a backhoe loader, a compact track loader and/or the like.

As shown, the work vehicle 10 includes a pair of front wheels 12, (one of which is shown), a pair of rear wheels 14 (one of which is shown), and a frame or chassis 16 coupled to and supported by the wheels 12, 14. An operator's cab 18 may be supported by a portion of the chassis 16 and may house various input devices for permitting an operator to control the operation of the work vehicle 10.

Moreover, as shown in FIG. 1, the work vehicle 10 may include a lift assembly 20 for raising and lowering a suitable implement 22 (e.g., a bucket) relative to a driving surface of the vehicle 10. In several embodiments, the lift assembly 20 may include a boom 24 (e.g., including one or more loader or boom arms) pivotably coupled between the chassis 16 and the implement 22. For example, as shown in FIG. 1, the boom 24 may include a forward end 26 and an aft end 28, with the forward end 26 being pivotably coupled to the implement 22 at a forward pivot point 30 and the aft end 28 being pivotably coupled to a portion of the chassis 16 at a rear pivot point 32.

In addition, the lift assembly 20 may also include one or more boom cylinders 34 coupled between the chassis 16 and the boom 24 and one or more tilt cylinders 36 coupled between the chassis 16 and the implement 22 (e.g., via a pivotably mounted bellcrank 38 or other mechanical linkage). It should be readily understood by those of ordinary skill in the art that the boom and tilt cylinders 34, 36 may be utilized to allow the implement 22 to be raised/lowered and/or pivoted relative to the driving surface of the work vehicle 10. For example, the boom cylinder(s) 34 may be extended and retracted in order to pivot the boom 24 upward and downwards, respectively, thereby at least partially controlling the vertical positioning of the implement 22 relative to the driving surface. Similarly, the tilt cylinder(s) 36 may be extended and retracted in order to pivot the implement 22 relative to the boom 24 about the forward pivot point 30, thereby controlling the tilt angle or orientation of the implement 22 relative to the driving surface.

The work vehicle 10 may also include a plurality of sensors for monitoring various operating parameters of the work vehicle 10. For instance, as shown in FIG. 1, the work vehicle 10 may include one or more position sensors for monitoring the position and/or orientation of the boom 24 and/or the implement 22, such as by including a first position sensor 40 provided in operative association with the boom 24 (e.g., at or adjacent to the pivot point 32 for the boom 24) and a second position sensor 42 provided in operative association with the implement 22 (e.g., at or adjacent to a pivot point 30 for the implement 22). The position sensor 40 may also allow the movement velocity of the boom 24 and the associated implement 22 to be determined by identifying the change in the angular position of the boom 24 over time. However, it should be appreciated that any other suitable sensors positioned at any other suitable location may be used to determine the position of the boom 24 and/or the implement 22. Further, as shown, the work vehicle 10 may include one or more inclination sensors configured to monitor the angle of inclination of the work vehicle 10, such as by including a dual-axis inclination sensor 44 mounted to the chassis 16 that is configured to monitor the angle of inclination of the work vehicle 10 in both a pitch direction (e.g., the front-to-back inclination) and a roll direction (e.g., the side-to-side inclination). Moreover, as will be described below with reference to FIG. 2, the work vehicle 10 may also include one or more pressure sensors 46, 48 (FIG. 2) for monitoring the pressure of the hydraulic fluid supplied to the boom lift cylinder(s) 34 and optionally, the tilt cylinder(s) 36, one or more speed sensors 50 (FIG. 2) for monitoring the speed of the work vehicle 10, and/or one or more temperature sensors 52 (FIG. 2) for monitoring the fluid temperature of the hydraulic fluid.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration.

Figure 2:
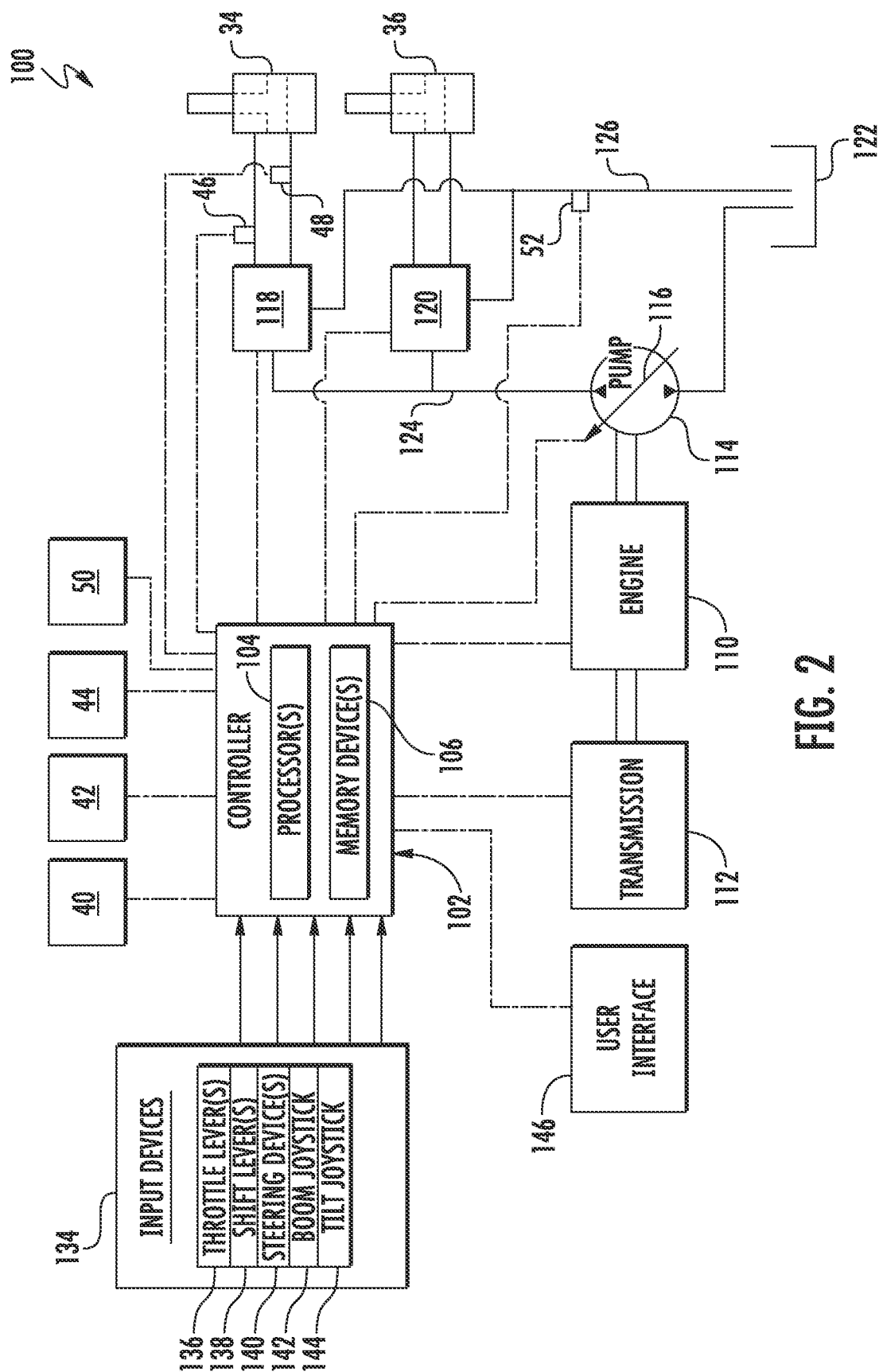
FIG. 2 illustrates a schematic view of one embodiment of a system for estimating the weight of a load carried by an implement of a work vehicle in accordance with aspects of the present subject matter.

Referring now to FIG. 2, a schematic, simplified view of one embodiment of a system 100 for estimating a load weight carried by an implement of a work vehicle is illustrated in accordance with aspects of the present subject matter. In general, the system 100 will be described herein with reference to the work vehicle 10 shown in FIG. 1. However, it should be appreciated that the disclosed system 100 may be utilized with any other suitable work vehicles to allow for the implement load weight to be estimated. It should be appreciated that hydraulic or fluid couplings of the system 100 shown in FIG. 2 are indicated by solid lines. Similarly, communicative links or electrical couplings of the system 100 shown in FIG. 2 are indicated by phantom lines.

As shown in FIG. 2, in several embodiments, the system 100 may include a controller 102. It should be appreciated the controller 102 may generally comprise any suitable processor-based device known in the art, such as one or more computing devices. Thus, in several embodiments, the controller 102 may include one or more processor(s) 104 and associated memory device(s) 106 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 106 of the controller 102 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 106 may generally be configured to store suitable computer-readable instructions that, when implemented by the processor(s) 104, configure the controller 102 to perform various computer-implemented functions, such as performing the various calculations and/or algorithms described herein. In addition, the controller 102 may also include various other suitable components, such as a communications circuit or module, one or more input/output channels, a data/control bus and/or the like.

It should also be appreciated that the controller 102 may correspond to an existing controller of the work vehicle 10 (e.g., an existing engine and/or transmission controller) or the controller 102 may correspond to a separate controller. For instance, in one embodiment, the controller 102 may form all or part of a separate plug-in module that may be installed within the work vehicle 10 to allow for the disclosed system and method to be implemented without requiring additional software to be uploaded onto existing control devices of the vehicle 10.

In several embodiments, the controller 102 may be configured to control the operation of one or more components of the work vehicle 10, such as one or more components of the vehicle's drivetrain and/or the vehicle's lift assembly 20. For example, the controller 102 may be communicatively coupled to one or more components of an engine 110 of the work vehicle 10 (e.g., an engine governor or engine control unit (ECU) (not shown)) via one or more communicative links in order to control and/or monitor the speed and/or torque output of the engine 110. Similarly, the controller 102 may be communicatively coupled to one or more components of a transmission 112 of the work vehicle 10 via one or more communicative links to control the operation of the transmission 112. For instance, the controller 102 may be configured to transmit suitable control commands via a communicative link(s) to one or more clutch valves (not shown) to control the engagement/disengagement of one or more clutches (not shown) of the transmission 112.

Moreover, the controller 102 may also be communicatively coupled to one or more components for controlling the operation of the various cylinders 34, 36 of the lift assembly 20 of the work vehicle 10. For example, in several embodiments, the controller 102 may be coupled to one or more pumps and associated control valves for controlling the flow of hydraulic fluid from a fluid tank of the work vehicle 10 to each cylinder 34, 36. Specifically, as shown in FIG. 2, the lift assembly 20 may include a hydraulic pump 114 driven via an output of the engine 110 and having a swash plate (e.g., indicated by arrow 116) for controlling the supply of hydraulic fluid to the control valves 118, 120 from a fluid tank 122 of the work vehicle 10. In such an embodiment, the controller 102 may be communicatively coupled to the hydraulic pump 114 (e.g., via a communicative link) so that the position or angle of the swash plate 116 of the hydraulic pump 114 may be automatically adjusted to regulate the discharge pressure of the pump 114. In one embodiment, the angle of the swash plate 116 may be adjusted via an associated actuator(s) (not shown) configured to be controlled by the controller 102.

As shown in FIG. 2, the hydraulic pump 114 may be fluidly coupled to control valves such as one or more boom control valves 118 and one or more tilt control valves 120 via one or more fluid lines 124. The boom control valve(s) 118 may generally be configured to regulate the supply of hydraulic fluid to the boom lift cylinder(s) 34 via the fluid lines 124 and the release of hydraulic fluid from the boom lift cylinder(s) 34 via return line 126 to the fluid tank 122, thereby controlling the extension/retraction of the boom lift cylinder(s) 34. Similarly, the tilt control valve(s) 120 may generally be configured to regulate the supply of hydraulic fluid to the tilt cylinder(s) 36 via the fluid lines 124 and the release of hydraulic fluid from the boom lift cylinder(s) 34 via the return line 126 to the fluid tank 122, thereby controlling the extension/retraction of the tilt cylinder(s) 36. In several embodiments, the control valves 118, 120 may correspond to electrically controlled valves (e.g., solenoid-activated valves) to allow the controller 102 to automatically control the operation of each valve 118, 120. For instance, as shown in FIG. 2, the controller 102 may be communicatively coupled to the control valves 118, 120 via associated communicative links, thereby allowing the controller 102 to regulate the extension/retraction of the associated cylinders 34, 36 via control of the valves 118, 120.

The controller 102 may also be communicatively coupled to one or more operator-controlled input devices 134 located within the vehicle's cab 18. As such, the controller 102 may be configured to receive various operator-initiated control commands for controlling the operation of the work vehicle 10. For instance, the controller 102 may be communicatively coupled to an engine throttle lever 136 to allow the controller 102 to receive control signals associated with operator-initiated engine speed commands for adjusting the engine speed of the engine 110. In addition, the controller 102 may be communicatively coupled to a shift lever 138 or other suitable input device configured to allow the operator to transmit control signals associated with operator-initiated shift commands for adjusting the current gear ratio of the transmission 112. Similarly, the controller 102 may be communicatively coupled to a steering device 140 or other suitable input device configured to allow the controller 102 to receive control signals associated with steering commands for adjusting the vehicle's steering angle as the operator manipulates the steering device 140 (e.g., a steering wheel) of the work vehicle 10. Moreover, the controller 102 may be communicatively coupled to one or more boom joysticks 142 for receiving control signals associated with operator-initiated control commands for controlling the movement of the boom 24 (e.g., by controlling the lift cylinder 34 pressure) and/or the one or more tilt joysticks 144 associated with operator-initiated control commands for controlling the movement of the implement 22 (e.g., by controlling the tilt cylinder 36 pressure).

As indicated above, the controller 102 may also be communicatively coupled to one or more position sensors 40, 42 (e.g., via communicative links) for monitoring the position(s) and/or orientation(s) of the boom 24 and the implement 22. In several embodiments, the position sensor(s) 40, 42 may correspond to one or more angle sensors (e.g., a rotary or shaft encoder(s) or any other suitable angle transducer(s)) configured to monitor the angle or orientation of the boom 24 and/or implement 22 relative to one or more reference points. For instance, in one embodiment, the first angle sensor(s) 40 positioned at the rear pivot point 32 of the boom 24 allows the angular position of the boom 24 relative to the work vehicle 10 to be monitored. Similarly, in one embodiment, the second angle sensor(s) 42 positioned at one of the front pivot points 30 allows the position of the implement 22 relative to the boom 24 to be monitored. In alternative embodiments, the position sensors 40, 42 may correspond to any other suitable sensors that are configured to provide a measurement signal associated with the position and/or orientation of the respective element (e.g., the boom 24 relative to the work vehicle 10, or the implement 22 relative to the boom 24). It should be appreciated that the position sensors 40, 42 may also allow the movement velocity of the boom 24 and the implement 22 to be determined by identifying the change in position of such components over time.

Further, as indicated above, the controller 102 may also be communicatively coupled to one or more inclination sensors 44 (e.g., via communicative link(s)) configured to monitor the angle of inclination of the work vehicle 10. For example, in several embodiments, the inclination sensor(s) 44 may comprise one or more one or more accelerometers, inclinometers, gyroscopes and/or any other suitable inclination sensor(s) configured to monitor the angle of inclination of the work vehicle 10 by measuring its orientation relative to gravity. For instance, as described above with reference to FIG. 1, the inclination sensor(s) 44 may correspond to a dual-axis sensor mounted to a portion of the chassis 16 to allow the sensor(s) 44 to monitor the angle of inclination of the work vehicle 10 in two directions (e.g., the pitch and roll directions of the work vehicle 10). However, in other embodiments, the inclination sensor(s) 44 may be disposed on the work vehicle 10 at any other suitable location.

Moreover, in several embodiments, the system 100 may also include one or more pressure sensors 46, 48 communicatively coupled to the controller 102 (e.g., via communicative links) to allow the controller 102 to monitor the fluid pressure of the hydraulic fluid being supplied to the lift cylinder(s) 34. For instance, as shown in FIG. 2, the controller 102 may be coupled to first and second pressure sensors 46, 48 provided in fluid communication with the fluid lines provided between the boom control valve(s) 118 and the boom cylinder(s) 34, with the first pressure sensor 46 being configured to monitor the fluid pressure of the hydraulic fluid supplied to the rod-side of the boom cylinder(s) 34 and the second pressure sensor 48 being configured to monitor the fluid pressure of the hydraulic fluid supplied to the piston-side of the boom cylinder(s) 34. Although not shown, it should be appreciated that similar pressure sensors may also be provided in fluid communication with the fluid lines associated with the tilt cylinder(s) 36 to monitor the fluid pressure of the hydraulic fluid being supplied to the rod-side(s) and the piston-side(s) of such cylinder(s) 36.

Referring still to FIG. 2, the controller 102 may also be communicatively coupled to any other suitable sensors configured to monitor one or more operating parameters of the work vehicle 10 and/or its components. For instance, the controller 102 may also be communicatively coupled to the speed sensor(s) 50 that allows the controller 102 to monitor the speed and/or acceleration of the work vehicle 10. For example, in one embodiment, the speed sensor(s) 50 may be any suitable rotational speed sensor positioned at a drive shaft of the engine 110 coupled to one or more of the wheels 12, 14 and allows the rotational speed of the drive shaft to be monitored, which is indicative of the ground speed of the vehicle 10.

It should be appreciated that the controller 102 may also be communicatively coupled to one or more temperature sensors 52 (e.g., via a communicative link(s)) configured to allow the temperature of the hydraulic fluid utilized within the vehicle's hydraulic system to be monitored. For instance, as shown in FIG. 2, the temperature sensor(s) 52 may, in one embodiment, be provided in operative association with a return line 126 for the hydraulic fluid to allow the fluid temperature of the hydraulic fluid being returned to the fluid tank 122 to be monitored.

Additionally, the controller 102 may be communicatively coupled to a user interface 146 associated with the work vehicle 10 and the implement 22. In general, the user interface 146 may correspond to any suitable input device(s) configured to allow an operator to provide operator inputs to control the operation of the one or more components of the work vehicle 10 and implement 22. For instance, in one embodiment, the user interface 146 includes one or more of the input devices 134, or any other suitable knob(s), button(s), touch screen display(s), keyboard(s), joystick(s), switch(es), and/or combinations thereof for controlling the operation of the work vehicle and the implement 22. Additionally, the user interface 146 includes various output devices that are controllable by the controller 102 to display or otherwise indicate one or more operating conditions of the work vehicle 10 and the implement 22 to an operator. For instance, the controller 102 may indicate to an operator at least the weight of the load being carried by the implement 22, with the weight of the load being determined as will be described in greater detail below. It should be appreciated that the user interface 146 may include a screen display(s) or any other or additional suitable indicator(s), such as light(s), audio device(s) (e.g., alarm(s), speaker(s), etc.), and/or the like to provide indicators to the operator. It should additionally be appreciated that, in some embodiments, the user interface 146 is housed in the operator's cab 18. However, in other embodiments, the user interface 146 is positioned remotely from the work vehicle 10.

Figure 3:
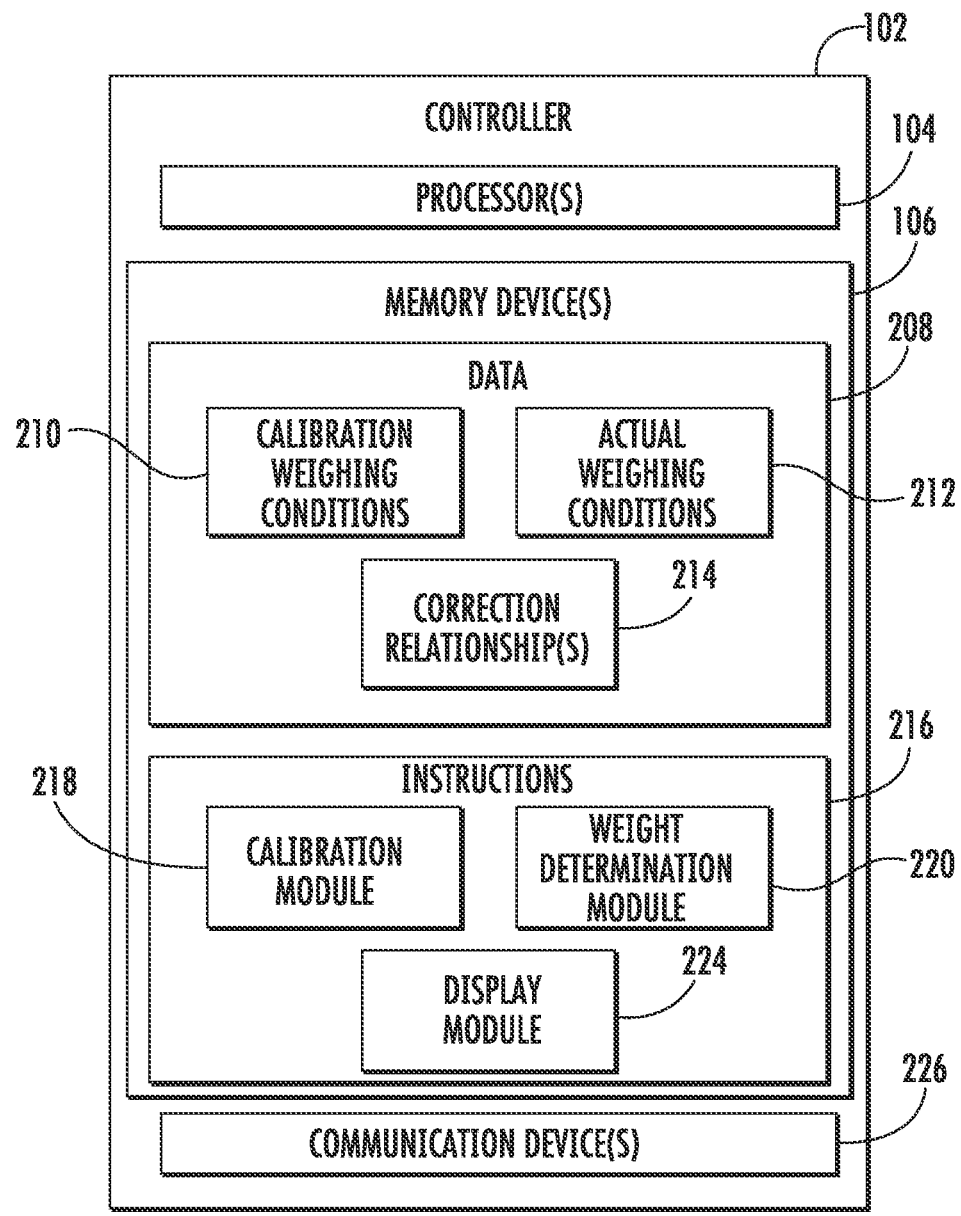
FIG. 3 illustrates another schematic view of one embodiment of a controller suitable for use within a system for estimating the weight of a load carried by an implement of a work vehicle in accordance with aspects of the present subject matter.

Referring now to FIG. 3, a schematic view of one embodiment of a controller 102 suitable for use within a system for estimating a load weight being carried by an implement associated with a work vehicle is illustrated in accordance with aspects of the present subject matter. In general, the controller 102 shown in FIG. 3 will be described with reference to an example implementation of the system components illustrated in FIGS. 1 and 2, such as the work vehicle 10, the implement 22, system 100, and related componentry. However, it should be appreciated that, in other embodiments, the controller 102 may be configured for use within any other suitable system configuration or architecture and/or may incorporate any other suitable components and/or combination of components that generally allow the controller 102 to function as described herein.

As indicated above, the controller 102 includes a processor(s) 104 and one or more associated memory device(s) 106. In one embodiment, the memory 106 of the controller 102 may include a calibration weighing conditions database 210 for storing data received from the sensor(s) 40, 42, 44, 46, 48, 50 (FIG. 2), and/or any other suitable source (e.g., an offsite server, separate database, separate controller, etc.), with the data relating various monitored operating parameters to a weight(s) of a known weight(s) lifted by the implement 22 while the implement 22 is subject to calibration weighing conditions. Particularly, in several embodiments, calibration or nominal conditions may include the work vehicle 10 being parked on a level surface (i.e., at a vehicle speed of zero and at a chassis inclination angle of zero), the implement 22 being tilted to a predetermined tilt angle (e.g., a completely rolled position), and the boom 24 (and associated implement 22) being raised and lowered at a constant, predetermined lift speed during each lifting operation (i.e., at an acceleration of zero). During calibration, the boom 24 may, for example, be raised from a first boom position to a second boom position at a first, constant lifting speed (e.g., minimum lifting speed), a second, constant lifting speed (e.g., maximum lifting speed), and optionally, an intermediate, constant lifting speed between the first and second lifting speeds while no load is being carried by the implement 22, with the sensor data being collected as the boom 24 is moved between the first and second boom positions at each speed. Such process may then be repeated while the implement 22 is carrying a calibration load of a known weight (e.g., the known weight being at or near the maximum weight load for the implement 22), with the sensor data being collected as the boom 24 is moved between the first and second boom positions at the first, constant lifting speed, the second, constant lifting speed, and optionally, the intermediate, constant lifting speed.

The term "calibration data" may include any suitable data transmitted to the controller 102 from the sensor(s) 40, 42, 44, 46, 48, 50 (FIG. 2) and/or any other suitable source, and stored within the calibration weighing conditions database 210 for subsequent processing and/or analysis. For instance, one or more lookup tables may be generated and stored in the calibration weighing conditions database 210 that correlate the various monitored operating parameters (e.g., lift force) to implement load weights. Further, the calibration data may include interpolated data based on the data from the sensors (s) 40, 42, 44, 46, 48, 50 (FIG. 2), correlating various operating parameters to implement load weights between the no-load weight and the known weight of the calibration load. Alternatively, or additionally, it should also be appreciated that, in one embodiment, the calibration data may be used as a nominal condition for the system 100. In such instance, suitable mathematical models or other stored relationships may be stored in the calibration weighing conditions database 210 and used for example, for estimating load weights as a function of the calibration or nominal weighing conditions.

Further, the memory 106 of the controller 102 may include one or more databases for storing data indicative of the weighing conditions for operating the implement 22 during "real" or actual weighing conditions. For instance, as shown in FIG. 3, the memory 106 includes an actual weighing conditions database 212 for storing data received from the sensor(s) 40, 42, 44, 46, 48, 50 (FIG. 2) as a load of unknown weight carried by the implement 22 is lifted by the implement 22 while the implement 22 is subject to actual weighing conditions as will be described in greater detail below. The term "actual weight data" 212 may include any suitable data transmitted to the controller 102 from the sensor(s) 40, 42, 44, 46, 48, 50 (FIG. 2) and/or any other suitable source, and stored within the actual weighing conditions database 212 for subsequent processing and/or analysis to determine the weight of the load being lifted by the implement 22, as will be described in greater detail below.

Additionally, the memory 106 of the controller 102 may include a correction relationships database 214 for storing correction relationships for correcting or adjusting the sensed lift forces during actual weighing conditions, where one or more of the actual weighing conditions differ from one or more of the nominal or calibration weighing conditions. The term "correction relationship data" may include any suitable algorithms or relationships from any suitable source, and stored within the correction relationships database 214 for subsequent processing and/or analysis of the data transmitted to the controller 102 from the sensor(s) 40, 42, 44, 46, 48, 50 (FIG. 2). Specifically, in one embodiment, the correction relationships database 214 includes one or more algorithms or stored relationships configured to correct or adjust the sensed force (e.g., the inputs indicative of the lift force received from the pressure sensor(s) 46, 48) for lifting the load carried by the implement 22 while the implement is subject to actual weighing conditions based at least in part on a model-based first or actual force value for lifting a given load of a known weight with the implement 22 at such actual weighing conditions and a model-based second or nominal force value for lifting the given load with the implement 22 as a function of the calibration or nominal weighing conditions. For instance, in one embodiment, a corrected or adjusted sensed force, $F_{Adjusted}$, can be calculated as a function of the sensed force, $F_{Sensed\_Actual}$, and a difference between a model-based actual force value, $F_{Model\_Actual}$ (e.g., as determined based on the actual weighing conditions) and a model-based nominal or second force value, $F_{Model\_Nominal}$, (e.g., as determined based on the nominal weighing conditions) using the following equation (Equation 1):

$$F_{Adjusted} = F_{Sensed\_Actual} - (F_{Model\_Nominal} - F_{Model\_Actual}) \quad (1)$$

Additionally or alternatively, in another embodiment, an adjusted, normalized sensed force, $F_{Adjusted\_Normalized}$, may be calculated as a function of the sensed force, $F_{Sensed\_Actual}$, and a ratio of the model-based nominal force value, $F_{Model\_Nominal}$, (e.g., as determined based on the nominal weighing conditions) to the model-based actual force value, $F_{Model\_Actual}$, (e.g., as determined based on the actual weighing conditions) using the following equation (Equation 2):

$$F_{Adjusted\_Normalized} = F_{Sensed\_Actual} * (F_{Model\_Nominal} / F_{Model\_Actual}) \quad (2)$$

In one embodiment, the model-based actual and nominal force values may be derived using a predetermined model for calculating the force associated with lifting implement loads based on the geometry/kinematics of the machine, where the predetermined model includes inputs for weighing conditions (e.g., work vehicle inclination, work vehicle acceleration, implement lift speed and acceleration, and implement tilt). Specifically, for a given load of known weight, the model may be used to calculate a model-based actual force value assuming operating conditions for the implement 22 that match the current actual weighing conditions and a model-based nominal force value assuming operating conditions of for the implement 22 that match the calibration or nominal weighing conditions. With such an approach, the force values calculated using the model can be used to correct or adjust the sensed force value deriving from the pressure sensors 46, 48 in a manner that minimizes any errors that may otherwise be introduced via the model. Specifically, since the actual and nominal force values are both calculated using the same model, any errors associated with the model may be cancelled out or otherwise minimized when correcting the sensed force value using such model-based force values.

It should be appreciated by those of ordinary skill in the art that the particular mathematical model utilized to model the force associated with lifting implement loads at different weighing conditions may generally be developed using any suitable means, such as through experimental trials conducted on the work vehicle 10, through computer-aided modeling of the work vehicle 10 and/or by deriving the model mathematically. For example, the model may be derived using several techniques including, but not limited to, a Newton method or an empirical method. When establishing the model via experimentation, a calibration load of known weight can be lifted across numerous experimental trials in which the relevant weighing conditions (e.g., vehicle inclination angle, vehicle acceleration, boom speed, boom acceleration, tilt angle, etc.) are varied to collect force data at various different combinations of operation conditions. Such model development techniques are well within the purview of one ordinary skill in the art and, thus, will not be described herein in any detail. In addition, it should be appreciated that the mathematical model used in accordance with aspects of the present subject matter may generally vary based on differing work vehicle configurations, particularly with respect to differing lift assembly configurations.

It should also be appreciated that, upon development of the model, suitable lookup tables may be created using the model that correlate the relevant weighing conditions to corresponding force values. Such lookup tables may then be stored within the memory 106 of the controller 102 to allow the model-based force values to be determined by the controller 102 without the increased processing requirements of the model, itself. For instance, by determining the current weighing conditions being experienced by the machine 10 (e.g., via the data received from the corresponding sensors), and an estimated weight, the lookup tables may be used to determine a first or actual force value corresponding to a model-based force values for lifting a given load under such conditions for such estimated weight. Similarly, the lookup tables may be used to determine a second or nominal force value corresponding to a model-based force values for lifting such load under the calibration or nominal weighing conditions for the machine for such estimated weight. Alternatively, a correlation value may be stored in the lookup tables that is indicative of a correlation between the first and second force values for the estimated weight and the actual weighing conditions. For instance, in one embodiment, the correlation value is indicative of a differential between the nominal and actual force values for the estimated weight and the actual weighing conditions as used in Equation 1. In another embodiment, the correlation value is indicative of a ratio of the nominal force value to the actual force value for the estimated weight and the actual weighing conditions as used in Equation 2.

As an alternative to determining the differential between the model-based nominal force value and the model-based actual force value as a function of the combination of all of the relative weighing conditions, such value may, instead, be determined by taking into account the effect of each actual individual weighing condition(s) at a time. Specifically, as indicated above, each actual weighing condition that differs from its corresponding nominal weighing condition creates a change in the lift force that would otherwise be required to lift a given assuming the machine is experiencing the nominal weighing condition. As such, the individual changes or correlation values caused by each actual weighing condition that differs from the corresponding nominal weighing condition can be determined and used as an equivalent to the differential correlation value between the model-based nominal force value, $F_{Model\_Nominal}$, and the model-based actual force value, $F_{Model\_Actual}$, in Equation 1. For instance, the following equation (Equation 3) provides an example relationship for calculating the differential between the model-based nominal force value, $F_{Model\_Nominal}$, and the model-based actual force value, $F_{Model\_Actual}$, as a function of the model-based nominal force value, $F_{Model\_Nominal}$, the individual model-based actual force value as a function of the actual tilt angle of the implement 22 and the remaining nominal tilt conditions besides the nominal tilt angle, $F_{Model\_Actual\_Tilt}$, the individual model-based actual force value as a function of the actual acceleration of the implement 22 and the remaining nominal conditions besides the nominal implement acceleration, $F_{Model\_Actual\_Acceleration}$, the individual model-based actual force value as a function of the actual lift speed of the implement 22 and the remaining nominal conditions besides the nominal lift speed, $F_{Model\_Actual\_Speed\_Lift}$, the individual model-based actual force value as a function of the vehicle acceleration and the remaining nominal conditions besides the nominal vehicle acceleration, $F_{Model\_Actual\_Acceleration\_Vehicle}$, and the individual model-based actual force value as a function of the actual inclination of the vehicle and the remaining nominal conditions besides the nominal inclination of the vehicle, $F_{Model\_Actual\_Inclination}$:

$$F_{Model\_Nominal} - F_{Model\_Actual} = (F_{Model\_Nominal} - F_{Model\_Actual\_Tilt}) + F_{Model\_Nominal} - F_{Model\_Actual\_Acceleration}) + (F_{Model\_Nominal} - F_{Model\_Actual\_Speed\_Lift}) + F_{Model\_Nominal} - F_{Model\_Actual\_Acceleration\_Vehicle}) + F_{Model\_Nominal} - F_{Model\_Actual\_Inclination}) \quad (3)$$

It should be appreciated that when an actual weighing condition does not differ from the respective nominal weighing condition, the respective differential between the model-based nominal force and the model-based actual force associated with the actual weighing condition is equal to 0. As such, the differential related to each of the actual weighing condition(s) that does not differ from the respective nominal weighing condition may be ignored.

Similarly, as an alternative to determining the ratio of the model-based nominal force value to the model-based actual force value as a function of the combination of all of the relative weighing conditions, such value may, instead, be determined by taking into account the effect of each individual weighing condition(s). Specifically, as indicated above, each actual weighing condition that differs from its corresponding nominal weighing condition creates a change in the lift force that would otherwise be required to lift a given assuming the machine is experiencing the nominal weighing condition. As such, the individual changes or correlation values caused by each actual weighing condition that differs from the corresponding nominal weighing condition can be determined and used as an equivalent to the correlation value as the ratio of the model-based nominal force value, $F_{Model\_Nominal}$, to the model-based actual force value, $F_{Model\_Actual}$, in Equation 2. For instance, the following equation (Equation 4) provides an example relationship for calculating the ratio of the model-based nominal force value, $F_{Model\_Nominal}$, to the model-based actual force value, $F_{Model\_Actual}$, as a function of the model-based nominal force value, $F_{Model\_Nominal}$, the individual model-based actual force value as a function of the actual tilt angle of the implement 22 and the remaining nominal conditions besides the nominal tilt angle, $F_{Model\_Actual\_Tilt}$, the individual model-based actual force value as a function of the actual acceleration of the implement 22 and the remaining nominal conditions besides the nominal implement acceleration, $F_{Model\_Actual\_Acceleration}$, the individual model-based actual force value as a function of the actual lift speed of the implement 22 and the remaining nominal conditions besides the nominal lift speed, $F_{Model\_Actual\_Speed\_Lift}$, the individual model-based actual force value as a function of the vehicle acceleration and the remaining nominal conditions besides the nominal vehicle acceleration, $F_{Model\_Actual\_Acceleration\_Vehicle}$, and the individual model-based actual force value as a function of the actual inclination of the vehicle and the remaining nominal conditions besides the nominal vehicle inclination, $F_{Model\_Actual\_Inclination}$:

$$F_{Model\_Nominal}/F_{Model\_Actual} = (F_{Model\_Nominal}/F_{Model\_Actual\_Tilt})*(F_{Model\_Nominal}/F_{Model\_Actual\_Acceleration})*(F_{Model\_Nominal}/F_{Model\_Actual\_Speed\_Lift})*(F_{Model\_Nominal}/F_{Model\_Actual\_Acceleration\_Vehicle})*(F_{Model\_Nominal}/F_{Model\_Actual\_Inclination}) \quad (4)$$

It should be appreciated that when an actual weighing condition does not differ from the respective nominal weighing condition, the respective ratio between the model-based nominal force to the model-based actual force associated with the actual weighing condition is equal to 1. As such, the ratio related to each of the actual weighing condition(s) that does not differ from the respective nominal weighing condition may be ignored.

As indicated above, a lookup table may be generated and stored within the controller's memory 106 (e.g., in the correction relationships database 214) for each relevant operating condition that charts the actual force attributed to each operating condition varying relative to the nominal operating condition. For example, in several embodiments, separate lookup tables may be stored within the controller's memory 106 that chart the individual model-based actual force value as a function of the actual tilt angle of the implement 22 and the remaining nominal conditions besides the nominal tilt angle, $F_{Model\_Actual\_Tilt}$, the individual model-based actual force value as a function of the actual acceleration of the implement 22 and the remaining nominal conditions besides the nominal implement acceleration, $F_{Model\_Actual\_Acceleration}$, the individual model-based actual force value as a function of the actual lift speed of the implement 22 and the remaining nominal conditions besides the nominal implement lift speed, $F_{Model\_Actual\_Speed\_Lift}$, the individual model-based actual force value as a function of the actual vehicle acceleration and the remaining nominal conditions besides the nominal vehicle acceleration, $F_{Model\_Actual\_Acceleration\_Vehicle}$, and the individual model-based actual force value as a function of the actual inclination of the vehicle and the remaining nominal conditions besides the nominal vehicle inclination, $F_{Model\_Actual\_Inclination}$. In such embodiments, the controller 102 may be configured to reference or access each individual lookup table, as necessary, to determine the actual force attributable to each individual variation in the actual weighing conditions from the nominal weighing conditions. Alternatively, as indicated above, lookup tables may be stored for each individual correlation value as a differential and/or ratio between the forces caused by the nominal and actual weighing conditions for each individual variation in actual weighing condition.

Referring still to FIG. 3, in some embodiments, instructions 216 stored within the memory 106 of the controller 102 may be executed by the processor(s) 104 to implement a calibration module 218. The calibration module 218 may generally be configured to control the work vehicle 10 to perform a calibration operation. The controller 102 may be configured to execute the calibration procedure or operation when the disclosed system 100 is used for the first time in association with the work vehicle 10 and/or periodically after extended use (e.g., every six months) to generate or adjust/update the predetermined relationships or lookup tables stored within the controller's memory 106 (e.g., in the calibration weighing conditions database 210) that relate the various monitored operating parameters to implement load weights or force values. Specifically, in several embodiments, to calibrate the system 100 for providing measurements of the load weight, the implement 22 performs lifting operations with a calibration load of a known weight and without a load under the calibration or nominal conditions as described. Moreover, in one embodiment, the controller 102 may be configured to automatically implement the calibration procedure(s). Specifically, upon receiving an input from the operator associated with initiating the calibration procedure, the controller 102 may be configured to automatically control the movement of the boom 24 while the load-related data is being collected. Such an automated calibration procedure would allow for improved accuracy and repeatability for the associated calibration measurements.

Further, the instructions 216 stored within the memory 106 of the controller 102 may be executed by the processor(s) 104 to implement a weight determination module 220. The weight determination module 220 may generally be configured to collect data from the sensor(s) 40, 42, 44, 46, 48, 50 (FIG. 2) as the boom 24 is moved across a range of angular boom positions. Subsequently, the module 220 may determine a corrected or adjusted force value associated with lifting the current load across such range of angular boom positions (e.g., as a function of the sensed force value and the model-based actual and nominal force values using one or more of Equations 1-4 described above).

Thereafter, the adjusted force value may be used to determine the weight of the load being carried by the implement 22. For instance, in one embodiment, a lookup table may be stored within the controller's memory 106 that correlates force values to corresponding weight values. In such an embodiment, upon determining the adjusted force value, the controller 102 may access the lookup table to determine the load weight.

It should be appreciated that, in one embodiment, the adjusted force is determined iteratively across a range of motion of the implement 22. For instance, a first adjusted force is taken as equivalent to the sensed actual force. A first estimation for the weight of the load is then determined based on the sensed actual force. Then, a second adjusted force for a sensed force across an associated range of motion may be determined, where the model-based actual and nominal force values, or the differential or ratio therebetween is determined using the calibration lookup tables as a function of the first estimation for the weight of the load. The second adjusted force value may then be used to determine a second estimation for weight of the load using the calibration lookup tables, which may then be used to determine a third adjusted force value in the same way. As such, the weight of the load is also estimated iteratively.

In some embodiments, the instructions 216 stored within the memory 106 of the controller 102 may also be executed by the processor(s) 104 to implement a display module 224. The display module 224 may generally be configured to control the operation of the user interface 146 (FIG. 2) to display or otherwise indicate to an operator of the work vehicle 10 the weight of the load estimated by the weight determination module 220. For example, the display module 224 may be configured to control a display screen of the user interface 146 to display the estimated weight of the load being carried by the implement 22.

It should also be appreciated that, in several embodiments, the controller 102 may be configured to include a communications module or interface 226 to allow for the controller 102 to communicate with any of the various other system components described herein. For instance, the controller 102 may, in several embodiments, be configured to receive data or sensor inputs from the sensor(s) 40, 42, 44, 46, 48, 50 (FIG. 2) that are used to detect one or more parameters associated with the operating condition of the work vehicle 10 via any suitable connections with the communications interface 226, such as a wired or wireless connection.

Figure 4:
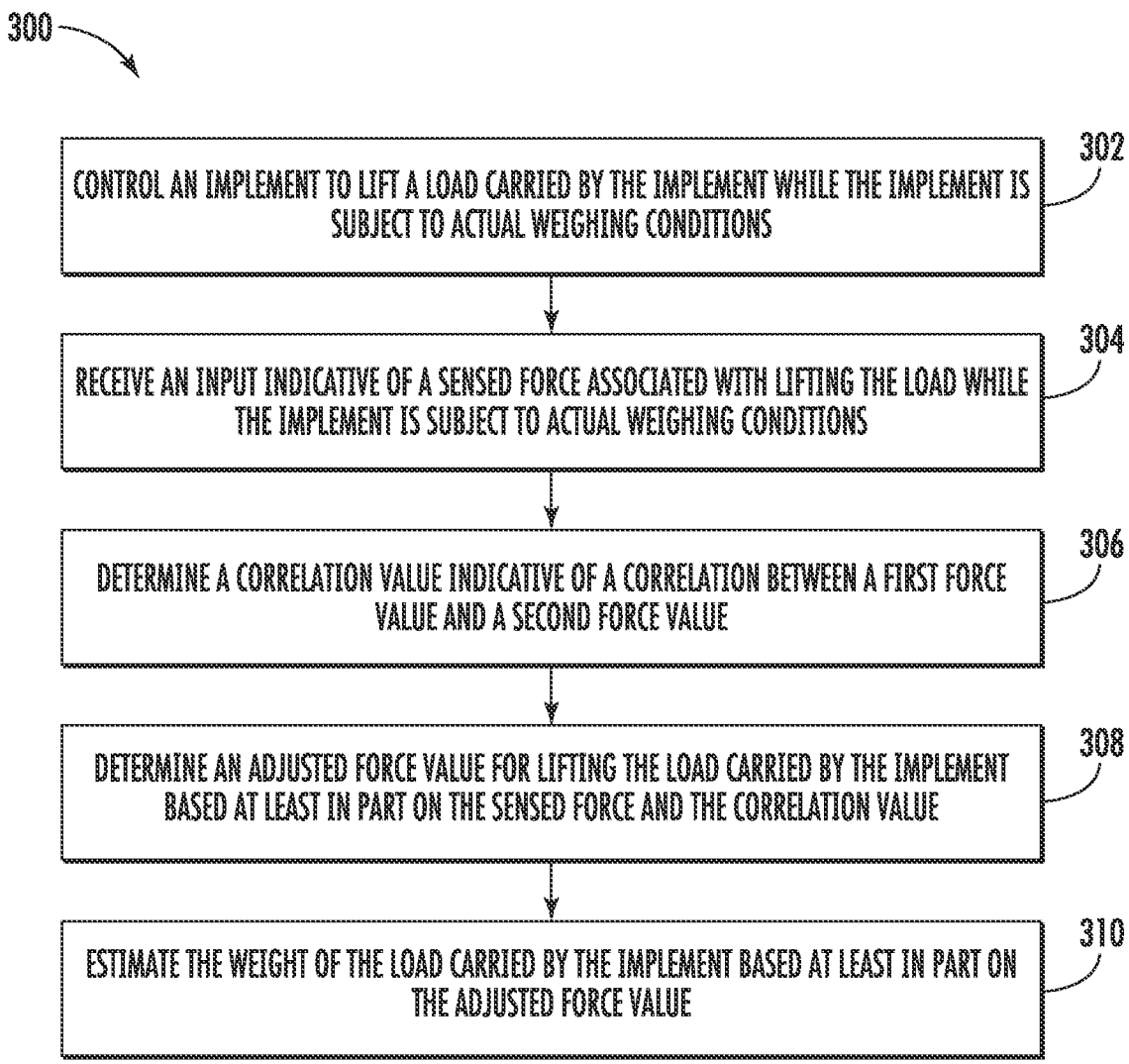
FIG. 4 illustrates a flow diagram of a method for estimating the weight of a load carried by an implement of a work vehicle in accordance with aspects of the present subject matter.

Referring now to FIG. 4, a flow diagram of one embodiment of a method 300 for estimating a weight of a load carried by an implement of a work vehicle is illustrated in accordance with aspects of the present subject matter. In general, the method 300 will be described herein with reference to the work vehicle 10 shown in FIG. 1, as well as the various system components shown in FIGS. 2-3. However, it should be appreciated that the disclosed method 300 may be implemented with work vehicles having any other suitable configuration and/or within systems having any other suitable system configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 4, at (302), the method 300 may include controlling an implement to lift a load carried by the implement while the implement is subject to actual weighing conditions. For instance, as described above, the controller 102 may be configured to control the operation of the boom 24 to move the implement 22 through one or more measurement regions while the implement 22 is subject to actual or real weighing conditions.

Further, at (304), the method 300 may include receiving an input indicative of a sensed force associated with lifting the load while the implement is subject to the actual weighing conditions. For instance, as indicated above, as the implement 22 is moved, load-related data may be collected or received from the pressure sensors 46, 48 indicative of a sensed or measured force for lifting the load with the implement 22 while the implement 22 is subject to actual weighing conditions.

At (306), the method 300 may include determining a correlation value indicative of a correlation between a first force value for lifting a given load of a known weight with the implement as a function of the actual weighing conditions a second force value for lifting the given load with the implement as a function of nominal weighing conditions. For instance, as described above, the correlation value may be indicative of a ratio of the second force value to the first force value or may be indicative of a difference between the first and second force values. A model-based first or actual force value may be determined or derived using a mathematical model or one or more lookup tables that correlate the force associated with lifting a given implement load with the various relevant weighing conditions that can impact such force. Using such model or lookup table(s), the first or actual force value may be determined based on the actual weighing conditions being experienced by the machine. Similar to the model-based actual force value described above, a model-based second or nominal force value may be derived or determined using the same mathematical model or lookup tables that correlate the force associated with lifting a given implement load with the various relevant weighing conditions that can impact such force. However, when determining the nominal force value, it is assumed that the machine is subject to nominal weighing conditions as opposed to the actual operating conditions being experienced by the machine. For instance, as described above, the nominal weighing conditions may, in one embodiment, assume that the work vehicle 10 is parked on a flat surface (i.e., no vehicle speed/acceleration and an inclination angle of zero), the implement 22 is raised or lowered at a constant, predetermined speed (i.e., a boom speed/acceleration of zero), and the implement 22 is tilted at a predetermined tilt angle. Alternatively, such correlation value may be determined from one or more lookup tables correlating correlation values to one or more weighing conditions.

Moreover, at (308), the method 300 may include determining an adjusted force value for lifting the load carried by the implement based at least in part on the sensed force and the correlation value. For instance, as indicated above, the sensed force may be adjusted based at least in part on the correlation value according to one or more of the relationships stored in the correction relationships database 214 of the controller 102 to determine an adjusted force value. For example, the adjusted force value may be determined, in several embodiments, using one or more of Equations 1-4 described above.

Additionally, at (310), the method 300 may include estimating the weight of the load carried by the implement based at least in part on the adjusted force value. For instance, as described above, the controller 102 may, in one embodiment, estimate the weight of the load by accessing a lookup table that correlates force values to load weights. In such an embodiment, the adjusted force value may be used as the input into the lookup table to determine the load weight.

It is to be understood that the steps of the method 300 are performed by the computing system 102 upon loading and executing software code or instructions which are tangibly stored on a tangible computer readable medium, such as on a magnetic medium, e.g., a computer hard drive, an optical medium, e.g., an optical disk, solid-state memory, e.g., flash memory, or other storage media known in the art. Thus, any of the functionality performed by the computing system 102 described herein, such as the method 300, is implemented in software code or instructions which are tangibly stored on a tangible computer readable medium. The computing system 102 loads the software code or instructions via a direct interface with the computer readable medium or via a wired and/or wireless network. Upon loading and executing such software code or instructions by the computing system 102, the computing system 102 may perform any of the functionality of the computing system 102 described herein, including any steps of the method 300 described herein.

The term "software code" or "code" used herein refers to any instructions or set of instructions that influence the operation of a computer or computing system. They may exist in a computer-executable form, such as machine code, which is the set of instructions and data directly executed by a computer's central processing unit or by a computing system, a human-understandable form, such as source code, which may be compiled in order to be executed by a computer's central processing unit or by a computing system, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a computing system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for estimating the weight of loads carried by implements associated with work vehicles, the method comprising:

controlling, with one or more computing devices, an implement to lift a load carried by the implement while the implement is subject to actual weighing conditions;

receiving, with the one or more computing devices, an input indicative of a sensed force associated with lifting the load while the implement is subject to the actual weighing conditions;

determining, with the one or more computing devices, a first force value for lifting a given load of a known weight with the implement as a function of the actual weighing conditions;

determining, with the one or more computing devices, a second force value for lifting the given load with the implement as a function of nominal weighing conditions, at least one of the actual weighing conditions being different from at least one of the nominal weighing conditions;

determining, with the one or more computing devices, a correlation value indicative of a correlation between the first force value and the second force value;

determining, with the one or more computing devices, an adjusted force value for lifting the load carried by the implement based at least in part on the sensed force and the correlation value; and estimating, with the one or more computing devices, the weight of the load carried by the implement based at least in part on the adjusted force value.

2. The method of claim 1, wherein the correlation value is indicative of a ratio of the second force value to the first force value, wherein determining the adjusted force value comprises multiplying the sensed force by the correlation value.

3. The method of claim 1, wherein the correlation value is indicative of a difference between the first and second force values, wherein determining the adjusted force value comprises subtracting the correlation value from the sensed force.

4. The method of claim 1, wherein determining the correlation value comprises accessing one or more lookup tables stored in the one or more computing devices, the one or more lookup tables correlating correlation values to one or more weighing conditions.

5. The method of claim 1, wherein determining the first force value for lifting the given load with the implement comprises accessing one or more lookup tables stored in the one or more computing devices, the one or more lookup tables correlating force values to one or more weighing conditions.

6. The method of claim 1, wherein determining the first force value comprises determining individual first force values, each of the individual first force values being determined as a function of a respective one of the at least one of the actual weighing conditions that is different from at least one of the nominal weighing conditions, wherein determining the correlation value comprises determining individual correlation values, each of the individual correlation values correlating a respective one of the individual first force values to the second force value.

7. The method of claim 1, wherein determining the second force value for lifting the given load with the implement comprises, accessing one or more lookup tables stored in the one or more computing devices, the one or more lookup tables correlating force values to one or more weighing conditions.

8. The method of claim 1, wherein the nominal weighing conditions comprise at least one of a vehicle acceleration of zero, a vehicle inclination angle of zero, a predetermined lift speed, a lift acceleration of zero, or a predetermined implement tilt angle.

9. The method of claim 1, wherein estimating the weight of the load carried by the implement comprises accessing one or more lookup tables that correlate the weight of the load to corresponding force values.

10. The method of claim 1, further comprising controlling, with the one or more computing devices, a user interface associated with the work vehicle to display the estimated weight of the load.

11. A system for estimating the weight of loads carried by implements associated with work vehicles, the system comprising:
- a work vehicle;
- an implement supported by the work vehicle; and
- a controller including a processor and associated memory, the memory storing instructions, that when implemented by the processor, configure the controller to:
  - control the implement to lift a load while the implement is subject to actual weighing conditions;
  - receive an input indicative of a sensed force associated with lifting the load while the implement is subject to the actual weighing conditions;
  - determine a first force value for lifting a given load of a known weight with the implement as a function of the actual weighing conditions;
  - determine a second force value for lifting the given load with the implement as a function of nominal weighing conditions, at least one of the actual weighing conditions being different from at least one of the nominal weighing conditions;
  - determine a correlation value indicative of a correlation between the first force value and the second force value;
  - determine an adjusted force value for lifting the load carried by the implement based at least in part on the sensed force and the correlation value; and
  - estimate the weight of the load carried by the implement based at least in part on the adjusted force value.

12. The system of claim 11, wherein the correlation value is indicative of a ratio of the second force value to the first force value,
wherein determining the adjusted force value comprises multiplying the sensed force by the correlation value.

13. The system of claim 11, wherein the correlation value is indicative of a difference between the first and second force values,
wherein determining the adjusted force value comprises subtracting the correlation value from the sensed force.

14. The system of claim 11, wherein determining the correlation value comprises accessing one or more lookup tables correlating correlation values to one or more weighing conditions.

15. The system of claim 11, wherein determining the first force value for lifting the given load with the implement comprises accessing one or more lookup tables correlating force values to one or more weighing conditions.

16. The system of claim 11, wherein the nominal weighing conditions comprise at least one of a vehicle acceleration of zero, a vehicle inclination angle of zero, a predetermined lift speed, a lift acceleration of zero, or a predetermined implement tilt angle.

17. The system of claim 11, wherein estimating the weight of the load carried by the implement comprises accessing one or more lookup tables that correlate the weight of the load to corresponding force values.

18. The system of claim 11, wherein the work vehicle is a wheel loader.

19. A method for estimating the weight of loads carried by implements associated with work vehicles, the method comprising:
- controlling, with one or more computing devices, an implement to lift a load carried by the implement while the implement is subject to actual weighing conditions;
- receiving, with the one or more computing devices, an input indicative of a sensed force associated with lifting the load while the implement is subject to the actual weighing conditions;
- determining, with the one or more computing devices, a correlation value indicative of a difference between a first force value for lifting a given load of a known weight with the implement as a function of the actual weighing conditions and a second force value for lifting the given load with the implement as a function of nominal weighing conditions, at least one of the actual weighing conditions being different from at least one of the nominal weighing conditions;
- determining, with the one or more computing devices, an adjusted force value for lifting the load carried by the implement by subtracting the correlation value from the sensed force; and
- estimating, with the one or more computing devices, the weight of the load carried by the implement based at least in part on the adjusted force value.

* * * * *